G. H. WILLEMS.
AUTOMATIC MOTOR VEHICLE JACK DEVICE.
APPLICATION FILED FEB. 5, 1920.
1,395,543.
Patented Nov. 1, 1921.
2 SHEETS—SHEET 2.
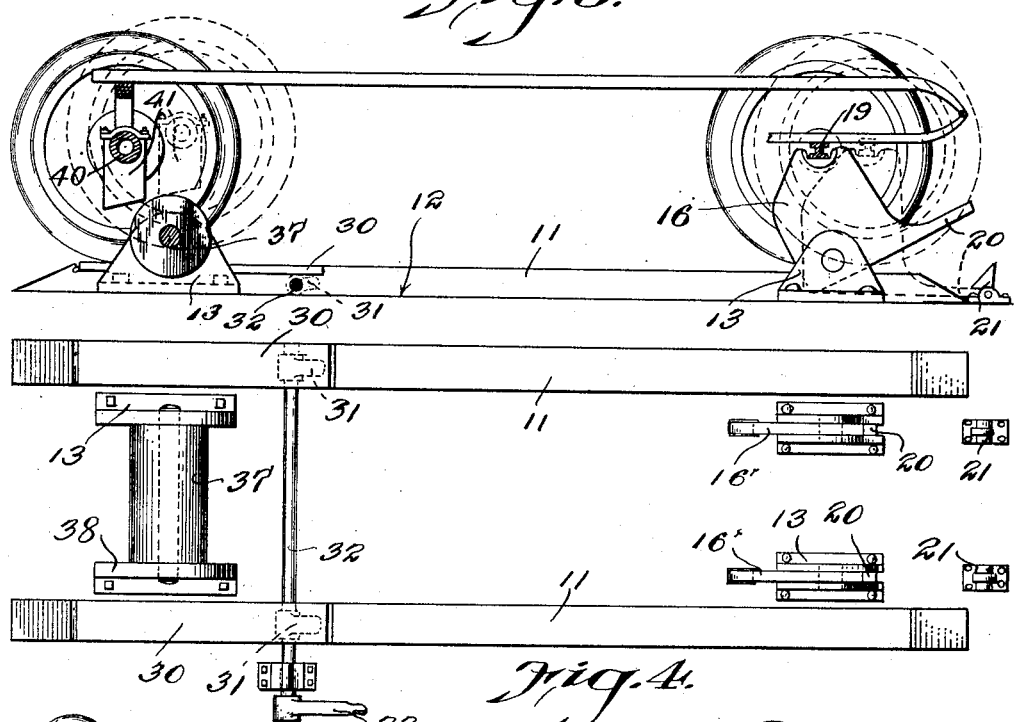
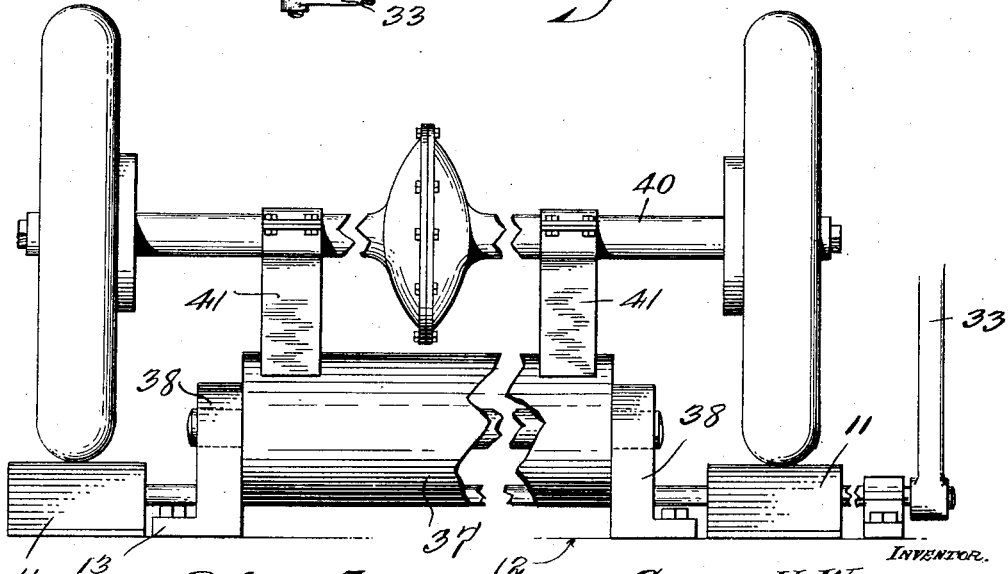
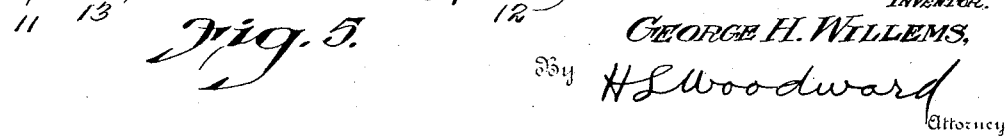
INVENTOR.
GEORGE H. WILLEMS,
By H. L. Woodward
Attorney

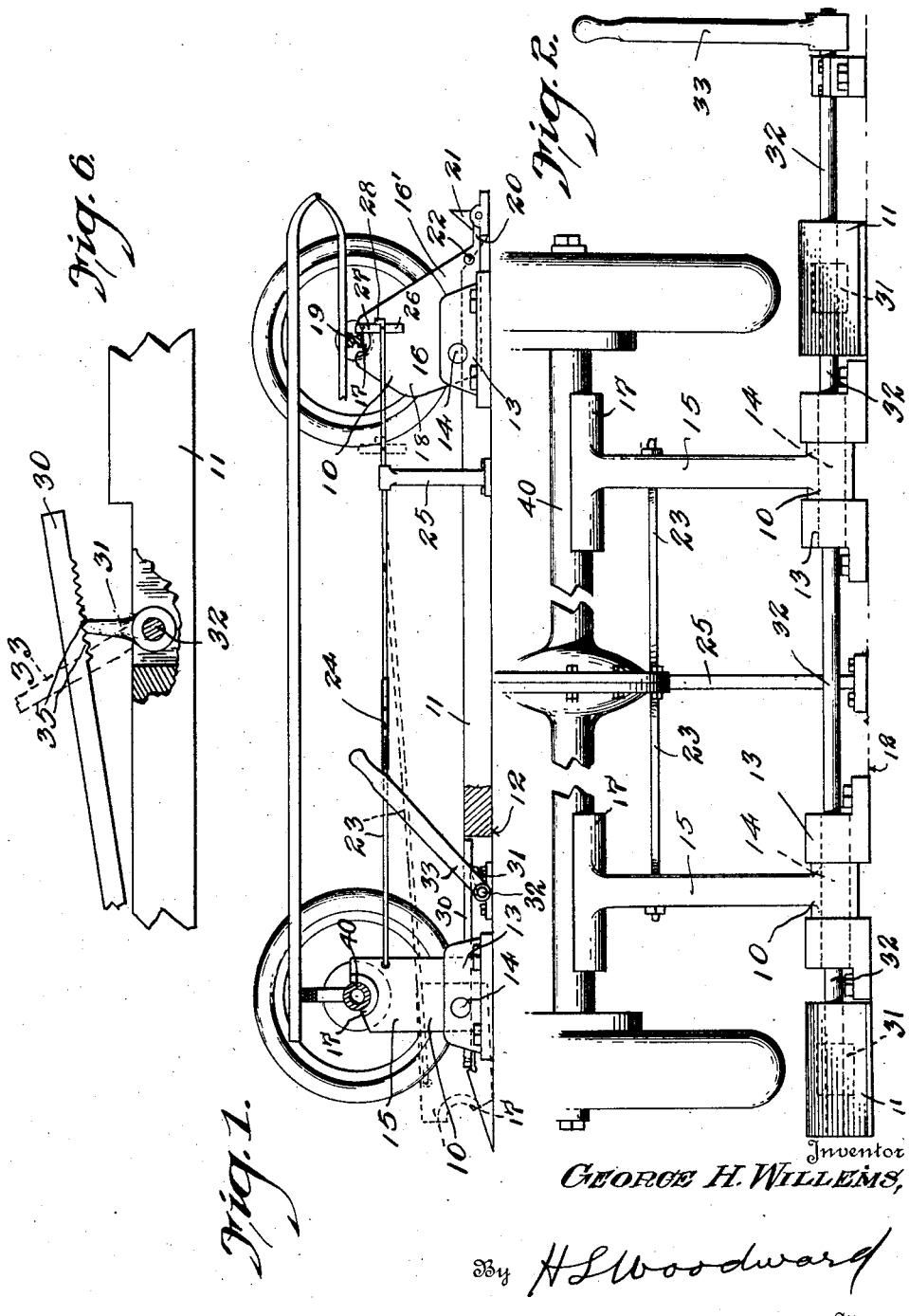

UNITED STATES PATENT OFFICE.

GEORGE H. WILLEMS, OF ROANOKE, ILLINOIS.

AUTOMATIC MOTOR-VEHICLE-JACK DEVICE.

1,395,543.  Specification of Letters Patent.  Patented Nov. 1, 1921.

Application filed February 5, 1920. Serial No. 356,480.

*To all whom it may concern:*

Be it known that I, GEORGE H. WILLEMS, a citizen of the United States, residing at Roanoke, in the county of Woodford and State of Illinois, have invented certain new and useful Improvements in Automatic Motor-Vehicle-Jack Devices, of which the following is a specification.

The invention has for an object to provide an improved form of mechanism for hoisting motor vehicles through the agency of their own power plant without requiring special operative connections with the power plant and my hoisting device. It is an aim of the invention to give a simple construction of apparatus of this character which will readily accommodate itself to various sizes and types of vehicles without requiring structural modifications. It is a further aim of the invention to provide an apparatus of this kind which may be operated by inexperienced persons without requiring great physical effort. It is also a purpose of the invention to present such a device which will enable a machine to be raised thereon and thereby by the driving of the vehicle on to the device, so that the motorist will not be required to leave his vehicle or to make arrangements or adjustments necessary for the lifting of his vehicle. Another aim is to provide such apparatus which is adapted to permit the driving of a vehicle into engagement therewith with a minimum liability of detrimental effects because of lateral variations in the position of the vehicle from an ideal medial position.

Additional objects, advantages, and features of invention will appear from the construction, arrangement, and combination of parts as hereinafter set forth and shown in the drawings, wherein, Figure 1 is a side elevation of one embodiment of my invention having a vehicle running gear engaged thereon, Fig. 2 is an end elevation thereof, Fig. 3 is a view similar to Fig. 1 of a modified construction, Fig. 4 is a plan view of the last named construction, Fig. 5 is a rear end view thereof, enlarged, Fig. 6 is a detail of the friction plate cam structure.

There is illustrated a motor vehicle lifting means including four elevators 10 which may be mounted directly upon the floor of a garage a suitable distance inwardly of the track ways or imaginary paths which will be followed by the wheels of a vehicle when it is driven into position where it is desired that it shall be raised. Associated with the elevators there may be two track members upon which the wheels of a vehicle may run, these track members being elevated above the floor 12. The elevators consist of base castings 13 in which suitable bearings are formed for the shafts 14, and upon these shafts there are mounted rocking legs 15 at the rear and 16 at the front. The legs are formed with recessed saddles 17 at their upper parts so formed that when the legs are inclined rearwardly in a predetermined position, they will receive and properly engage the axle portions of the vehicle when in forward movement and raise and support the same under forward propulsion. The forward legs 16 are formed with a forward extension 16' at the base of each, adapted to engage the floor when the saddle portions have passed a predetermined distance forwardly of dead center over the shaft 14. The legs 16 are also provided with rearward heels 18, adapted to engage the floor and support the legs while extended rearwardly with the saddle portion thereof at a level with the front axle of the machine to be raised, an axle 19 being shown engaged in the saddles of the legs 16 at the forward position. The forward extension 16' is provided with a lip 20 engaged by a latch 21 to retain the legs in forward position until release of the latch. There is also formed on the forward extension 16' a laterally projecting lug 22 beneath which a bar or other implement may be inserted for use as a lever to pry the extension upwardly and tilt the legs backwardly to disengage a supported car therefrom, in case this should be desired. The rear legs 15 are formed to lie at a lower level in their inoperative position than the legs 16 as shown in dotted lines. These legs are connected with a draw rod 23, having an adjusting means 24 centrally thereof by which the length may be varied as found desirable, a rest 25 being provided for the forward end of this rod. The rod is provided with a dog 26 at its forward end having an upwardly projecting arm 27 arranged in a position to engage the front axle or some other suitable element upon a vehicle and be drawn forwardly to raise the rear legs 15 in time to properly engage the rear axle of the same vehicle after the saddles upon the forward legs have passed forwardly beyond dead center over the shafts 14. One rod, support and dog are provided, although different arrangements may be made if desired. The dog 26 is pivoted upon the forward end of the rod so as to engage a lug 28 positioned in front of the dog at the upper part, when the dog is in vertical position, the lower part of the dog being weighted so that it will tend to hang in proper position for engagement, but may be tilted rearwardly by any part of the machine which may have to pass thereover.

At the outer sides of the rear legs 15 there are pivoted friction or traction plates 30 pivoted at their rear ends close upon the floor, or upon the track elements 11 in case such are employed, and adapted to lie flush with the upper sides of the track when lowered, the pivoted ends of the plates being located a distance rearwardly of the legs for a purpose which will appear. Pivoted beneath each of the plates there is a cam or wiper 31, mounted upon a suitable transverse shaft 32 the shaft extending beneath both friction plates, and being projected at one side, where it is provided with an operating lever 33 by which the shaft may be rotated to bring the arms 31 into raising engagement with the forward parts of the plates 30, whereby the tires of a supported vehicle will be engaged by the plates so as to afford sufficient traction for the vehicle to be moved rearwardly under its own power. In Fig. 6 a detail of the traction plate is illustrated in which the construction is such that as soon as the rear wheels of a vehicle have passed from the plates, the plates will automatically fall to inoperative position. This is accomplished by forming on the under side of the plate slight transverse corrugations 35, the lever 33 being extended forwardly as well as the arm 31, when the device is in operative position, so that in order to raise the traction plate the lever will be lifted and when at maximum elevation will be slightly inclined forwardly. As long as there is weight upon the plate, the arm 31 will be held in the slight corrugations against falling, but upon release of the plate from weight, the corrugations being of slight altitude, the weight of the lever will be sufficient to overcome the friction involved moving the device to inoperative position and permitting the plate to fall. It is desirable that the end of the arm 31 be rounded in order to facilitate its movement over the corrugations.

In Figs. 3 to 5 there is illustrated a construction in which the forward legs 16 may be similar and have a similar mounting to that previously described, and may be provided with similar means for securing them in forward position. In place of the legs 15, however, there is provided a roller 37 mounted upon suitable bearings 38 within the traction plates 30, the bearing of the roller being located at as low an elevation as possible, and the top of the roller being located lower than parts of the vehicle which must pass thereover in reaching its final position. Rail elements may also form a part of this construction if desired.

On the rear axle 40 of the vehicle, there are secured dependent leg elements 41, of a length to project slightly below the top of the roller 37 and having a lower face inclined slightly downward toward the rear.

In the last mentioned construction, the forward legs 16' are disposed in such position that the saddle parts will pass forwardly of dead center just before the lower parts of the legs 41 engage the roller 37. In this way, the traction of the rear wheels of the vehicle upon the floor or rails will carry the forward part of the vehicle into engagement with the legs 16' raising the forward part of the vehicle and when the legs are passed forwardly of dead center the weight of the vehicle will cause further forward movement carrying the vehicle forwardly into engagement with the roller 37 and causing raising of the rear part.

The action in the first described form of device is similar, the forward legs passing sufficiently beyond dead center while in engagement with the vehicle before the rear legs 15 are engaged to insure raising of the rear part by the effect of gravity on the forward part and by reason of the greater inclination of the forward legs.

Dismounting of the vehicle from the apparatus will be understood from the description of the traction plate.

What is claimed:

1. In a vehicle raising appliance, a lifting roll device having a fixed axis, and freely revoluble, a vehicle-mounted roll-engaging member having a lower surface inclined upwardly toward the front, its lower part being below the level of the top of the roll, and means to hold a vehicle against rearward movement at times.

2. In a vehicle raising device of the character described, a traction plate movable to engage the tires of supported wheels at times, and means to operate the traction plates, including a cam arm and operating lever, the underside of said plate being slightly corrugated for the purposes described.

3. In a vehicle raising device of the character described, traction plates movable to engage the tires of supported wheels at times, means to operate the plates, including a cam and operating lever, the parts being in a relation tending to return to inoperative position by gravity and to be frictionally held in operative relation by weight on said plates.

In testimony whereof I have affixed my signature in presence of two witnesses.

GEORGE H. WILLEMS.

Witnesses:
   JOHN E. WOLTZEN,
   IDA DE WILDE.